Patented Nov. 30, 1948

2,455,225

UNITED STATES PATENT OFFICE 2,455,225

METHOD OF MAKING STYRENE RESIN

Samuel G. Burroughs, Pittsburgh, Pa., assignor to Pennsylvania Industrial Chemical Corporation, Clairton, Pa., a corporation of Pennsylvania No Drawing. Application August 15, 1944, Serial No. 549,636

2 Claims. (Cl. 260—91)

This invention relates to a method of making styrene resin.

As is well known, styrene polymerizes under the influence of heat to form polymers of high molecular weight which are insoluble in primarily aliphatic hydrocarbon solvents. Also a resin composed of such styrene heat polymers, unless it is combined with a plasticizer, lacks brittleness and thermoplasticity.

The object of this invention is to provide a method of making solid thermoplastic styrene resin of moderate molecular weight and melting point which has the utilities possessed by the commonly produced thermoplastic resins of analogous molecular weight and melting point, such as coumarone-indene resin, terpene resin, ester gum, and the like, and which has the additional property of being substantially oil proof in that it is insoluble in the higher boiling aliphatic hydrocarbon liquids at normal room temperature, and is insoluble or sparingly soluble in the low boiling aliphatic hydrocarbon solvents at that temperature; but which resin has good solubility in all the common aromatic hydrocarbon solvents.

This object I accomplish primarily by forming resin polymers of styrene under the polymerization-inducing effect of a slightly acid clay having a pH close to 6. A type of clay which possesses this requirement, and which typifies such clays, is fuller's earth having a pH close to 6, and which thus may be considered as a weakly acid clay. I prefer to use such clay in a condition as dry as it is possible in practice to obtain, desirably heating it to a temperature of at least 200° C. for a short period of time (five minutes) before it is used, or keeping it carefully out of contact with moisture after being so heated until it is used. I have found that the polymerization-inducing effect of the clay, even though it has such relatively low acidity, is so much more rapid than the tendency of styrene to undergo auto-polymerization under the influence of heat that I am able to conduct a clay-induced polymerization of styrene to form a solid resin of moderate melting point and moderate molecular weight at a relatively high temperature and under widely varied conditions.

The resin produced in accordance with the method of my invention is light in color and gives a clear solution with the aromatic hydrocarbon solvents, and with other aromatic solvents of the same or greater solvent power. Its use is indicated in the making of oil proof tile, in compounding rubber, and in coating compositions purposed to give oil proof finishes.

I may exemplify my method of making styrene resin as follows:

Example 1

In this example I placed 500 cc., or 450 grams, of commercially pure (about 98%) styrene liquid, without diluent, in a vessel equipped with a hot water jacket and with cooling coils. To this reaction liquid I slowly added with agitation 12.5 grams of fuller's earth having a pH of 6, and agitated the clay in reactive contact with the styrene at a temperature of 70° C. to 72° C. for a total period of one hour at which time the polymerization reaction appeared to have proceeded to completion. The clay was finely divided to pass through a 200 mesh screen, and had been heated to a temperature of 250° C. for five minutes shortly before its use. During the progress of the reaction when the reaction liquid began substantially to thicken it was diluted with 100 cc. of refined solvent naphtha to facilitate stirring.

At the end of the polymerization reaction, the reaction liquid was diluted with 150 cc. of refined solvent naphtha and the clay was filtered out. Upon distilling the solution for the removal of solvent and unreacted styrene and then steam distilling, I obtained 28 grams of heavy oil boiling about 300° C., and 296 grams of resin having a melting point of 106° C. (ball and ring). This resin is water white and precipitates from white mineral oil (pure high boiling aliphatic hydrocarbon). It is insoluble in an equal weight of mineral spirits at normal room temperature, but is soluble in the aromatic hydrocarbon solvents in all proportions down to and below a temperature of 0° C.

Example 2

In this example I placed 500 cc., or 450 grams, of commercially pure (about 98%) styrene liquid, without diluent, in a vessel equipped with a hot water jacket and with cooling coils. To this reaction liquid I slowly added with agitation 76.5 grams of fuller's earth having a pH of 6, and dried as in Example 1, and agitated the clay in reactive contact with the styrene at a temperature of 40° C. to 43° C. for a period of six and one-half hours, at which time the polymerization reaction appeared to have proceeded to completion. The clay was finely divided to pass through a 200 mesh screen and had been heated to a temperature of 250° C. for five minutes shortly before its use.

Upon distilling the solution for the removal of solvent and then steam distilling, I obtained 43 grams of heavy oil boiling about 300° C. and 158 grams of water-white resin having a melting point of 130° C. (ball and ring). This resin precipitates from white mineral oil at a temperature of 103° C., and is insoluble in mineral spirits in almost all proportions at normal room temperatures. It is, however, soluble in the aromatic hydrocarbon solvents in all proportions down to and below a temperature of 0° C.

*Example 3*

In this example I placed 500 cc., or 450 grams, of commercially pure (about 98%) styrene liquid, without diluent, in a vessel equipped with a hot water jacket and with cooling coils. To this reaction liquid I slowly added with agitation 17 grams of Attapulgus clay having a pH of 6 dried as in Example 1, and agitated the clay in reactive contact wtih the styrene at a temperature of 103° C. to 135° C. for a total period of five and one-quarter hours, at which time the polymerization reaction appeared to have proceeded to completion. The clay was finely divided to pass through a 200 mesh screen and had been heated to a temperature of 250° C. for five minutes shortly before its use.

At the end of the polymerization reaction the reaction liquid was diluted with 100 cc. of refined solvent naphtha and the clay was filtered out. Upon distilling the solution for the removal of solvent and unreacted styrene, and then steam distilling for the removal of heavy oil, I obtained 36 grams of heavy oil and 305 grams of solid resin having a melting point of 94° C. (ball and ring). This resin has a color 1 on the Gardner-Holt scale, and precipitates from white mineral oil at a temperature of 87° C. It is insoluble in an equal weight of mineral spirits at normal room temperature, but is soluble in the aromatic hydrocarbon solvents in all proportions down to and below a temperature of 0° C.

The approximately pure monomeric styrene liquid used in all the foregoing examples was a styrene obtained from the dehydrogenation of ethyl benzene. In polymerizing styrene under the polymerization-inducing effect of a weakly acid clay having a pH of about 6, it is necessary to use a starting material having a relatively high concentration of styrene in order to obtain a substantial yield of resin. All the reasonably anticipated variables are present in conducting the polymerization step of this process. That is, at relatively low temperature there is a tendency to form higher melting point resin which is obtained in a smaller proportional yield, and at more elevated temperature there is a tendency to obtain a larger yield of resin of somewhat lower melting point. There is no upper limit to the temperature at which the polymerization reaction may be conducted save that imposed by the boiling point of the styrene itself, and there is no lower limit of temperature save that dictated by economy in manufacture. At temperatures below 30° C. the polymerization reaction tends to take place so slowly and to give a yield of high melting point resin proportionately so small that such temperatures are uneconomical unless it should be desired to produce a resin of particularly good color having a melting point higher than the resin produced in Example 2, and to put the monomeric styrene unpolymerized under the polymerization-inducing effect of the clay to some other use, as by subsequently subjecting it to heat polymerization. The quantity of clay desirably used varies with the temperature at which the polymerization reaction is conducted, an increased quantity of clay desirably being used at the lower reaction temperatures. Thus in Example 2, the clay having a pH of 6 is used in a quantity equal to 17% the weight of the styrene; in Example 3 the clay is used in a quantity equal to 4% the weight of the resin; and in Example 1, in which the polymerization temperature is intermediate the temperature used in Example 2 and Example 3, the catalyst clay is used in a proportion of about 5.5% the weight of the styrene. At temperatures about and below 30° C. it is desirable to use increased quantities of the clay, such as quantities equal to 25% to 30% the weight of the styrene. It is to be understood that the quantity of clay desirably used largely depends in every instance on the efficiency with which it has been dried.

I have, however, discovered that the tendency of the styrene to polymerize under the polymerization-inducing effect of the mildly acid clay proceeds so much more rapidly than the slow progress of auto-polymerization under the influence of heat, that as little as 1% of the clay is sufficient to produce catalytic polymerization and to prevent the formation of high molecular weight heat polymers, even at high temperatures such as the temperature under which the polymerization reaction is conducted in Example 3. That is, as temperature is increased and there would be a tendency toward auto-polymerization upon subjection of the monomeric styrene to temperature of such elevation during long period of time, the temperature serves to stimulate the clay-induced polymerization in such manner that very small proportional quantities of clay are adequate to lead heat polymerization.

Whereas the styrene resin produced in accordance with the exemplification of Examples 1 to 3 inclusive is substantially insoluble in low boiling aliphatic hydrocarbon solvents at normal room temperature, it has good solubility in mixed hydrocarbon solvents composed chiefly of aliphatic hydrocarbon solvent with only a proportionately small addition of an aromatic hydrocarbon solvent.

I have found that in polymerizing the styrene with a weakly acid clay having a pH of about 6 styrene concentration of the starting material is critical to the extent that with concentrations of styrene in the reaction liquid substantially below 50%, the total yield of resin becomes uneconomically small.

*Example 4*

In this example I prepared a starting liquid by diluting commercially pure (about 98%) styrene with enough refined solvent naphtha to reduce the styrene concentration to 85%. I placed 500 cc., of 450 grams, of this blend in a vessel equipped with a hot water jacket and with cooling coils. To this reaction liquid I slowly added with agitation 45 grams of fuller's earth having a pH close to 6 which had been passed through a 200 mesh screen, and agitated the clay in reactive contact with the styrene for a total period of six hours. The temperature of the liquid was maintained within the approximate range of 103° C. to 135° C. during this polymerization period. At the end of six hours, at which time the polymerization reaction appeared to have proceeded to completion, the clay was filtered out and the solution was distilled for the removal of solvent and unreacted styrene, and was then stream distilled for the removal of heavy oil. As products of this reaction I obtained 54 grams of heavy oil and 256 grams of solid resin having a melting point of 86° C. (ball and ring). This resin has a color 1 on the Gardner-Holt scale and precipitates from white mineral oil at a temperature of 62° C. It is insoluble in an equal weight of mineral spirits at normal room temperature, but is soluble in mineral spirits with slight warming to about 100° F., and is soluble in the aromatic hydrocarbon solvents in all proportions down to and below a temperature of 0° C.

It will be noted that the conditions of Example 4 parallel very closely the conditions of Example 3, but that the result of the decreased concentration of styrene is to give a lower yield of lower melting point resin. Below a concentration of 80% styrene the capacity of the reaction liquid reactively to respond to contact with the weakly acid clay continues to decrease, and it falls off very rapidly in styrene concentrations below 50%.

In all the examples the commercially pure styrene used as a starting material was obtained by the dehydrogenation of ethyl benzene. In every example the clay is stated to have been passed through a screen having 200 meshes to the inch. I have, however, used clay less finely divided, that is, clay passed through a screen having 100 meshes to the inch, and clay which is more finely divided having been passed through a screen having 300 meshes to the inch. With a somewhat coarser clay the results of the reaction were identical save that the reaction took place somewhat more slowly. When the more finely divided clay was used no difference in either results or time was noted. Unless specifically so stated in an example it may be assumed that the clay was dried as completely and rapidly as possible before use. There is advantage even in those examples which utilize high temperature in having the clay dry when initially brought into reactive contact with the reaction liquid.

Where proportions are given without qualification throughout the examples, and elsewhere throughout the specification and claims, they are to be taken as in parts by weight. Where throughout the specification and claims melting point is given without qualification it is to be taken as by the ball and ring method of melting point determination for resins.

It is to be understood that I do not intend to limit myself to the specific description and exemplifications of my invention, nor to the specific terms used in so doing, and that my invention is to be restricted only by the limitations placed thereon by the claims appended hereto.

I claim as my invention:

1. The method of making thermoplastic styrene resin insoluble in aliphatic hydrocarbon solvents and soluble in aromatic hydrocarbon solvents by bringing finely divided weakly acid catalyst clay which is fuller's earth having a pH of about 6 and which has been dried at a temperature within the range of 200° C. to 250° C. for a period of five minutes into reactive contact with a styrene liquid having a concentration of above 80% monomeric styrene in a single reaction stage and at a temperature below the boiling point of the monomeric styrene in the proportion of 1% to 30% clay to styrene to form resin polymers of styrene, and separating the resin polymers so formed from the said catalyst clay.

2. The method of making thermoplastic styrene resin insoluble in aliphatic hydrocarbon solvents and soluble in aromatic hydrocarbon solvents by bringing finely divided weakly acid catalyst clay which is fuller's earth having a pH of about 6 and which has been dried at a temperature within the range of 200° C. to 250° C. for five minutes into reactive contact with a styrene liquid having a concentration of above 50% styrene in a single reaction stage and at a temperature below the boiling point of the monomeric styrene in the proportion of 1% to 30% clay to styrene to form resin polymers of styrene, and separating the resin polymers so formed from the said catalyst clay.

SAMUEL G. BURROUGHS.

REFERENCES CITED

The following references are of record in the file of this patent:

UNITED STATES PATENTS

| Number | Name | Date |
|---|---|---|
| 2,197,861 | Hyman | Apr. 23, 1940 |
| 2,227,808 | Driesbach | Jan. 7, 1941 |
| 2,345,962 | Cline | Apr. 4, 1944 |

FOREIGN PATENTS

| Number | Country | Date |
|---|---|---|
| 524,156 | Great Britain | July 31, 1940 |

OTHER REFERENCES

Brajnikoff, Plastics (London, July 1942), pp. 230–238.

Stanley, Chem & Ind., July 29, 1938, pp. 93–98